United States Patent Office 3,387,440
Patented June 11, 1968

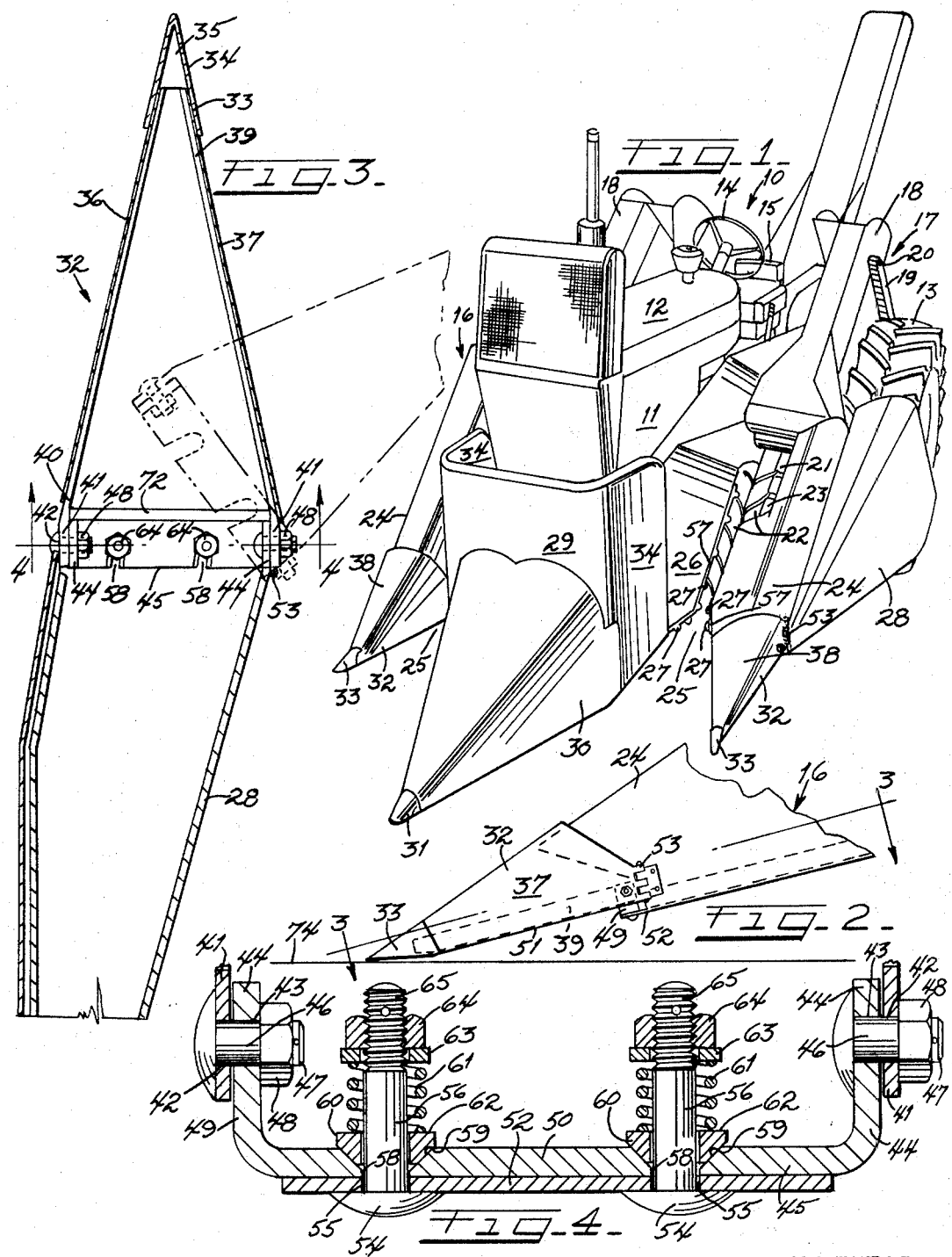

3,387,440
IMPACT RELIEF MECHANISM FOR ROW DIVIDERS AND THE LIKE
Elof K. Karlsson, East Moline, Ill., assignor to International Harvester Company, Chicago, Ill., a corporation of Delaware
Filed Apr. 14, 1965, Ser. No. 448,064
5 Claims. (Cl. 56—119)

ABSTRACT OF THE DISCLOSURE

A corn harvesting machine having row dividers that extend downwardly and forwardly and terminate in ground-engageable shoes. The ground-engageable shoes are pivotally mounted about generally vertically axes and are retained in position by impact relief means. The ground-engageable shoes are upon impact with an obstruction adapted to swing out from the divider to prevent damage to the equipment.

---

The instant invention relates to corn harvesters and the like. Particularly the invention relates to row dividers carried on the forward end portions of harvesters which are adapted to harvest row crops such as corn and the like. Specifically the invention relates to relief mechanism responsive to impact forces on row pointers or dividers of harvesters and the like.

Conventional harvesters, such as corn harvesters and the like, are adapted to harvest two rows of crop simultaneously by means of a pair of like power driven row units which are carried on opposite sides of a tractor body. In the harvesting of corn, for example, a tractor body, which is disposed medially of a pair of row units, carries on the forward end thereof an elongated center divider which is adapted to be driven between a pair of rows of corn. Each of the pair of row units comprises a shield or housing for a gathering chain, a pair of snapping rolls and a first elevator. On the forward end portion of the housing of each of the row units, there is mounted a curved casing or shield member variously referred to by terms including "side divider," which includes at its forward end portion a ground engaging member or shoe which is adapted to ride on the ground to the outside of a row to be harvested. Thereby, a pair of adjacent rows of crop to be harvested may be successively brought into a pair of throats, respectively, which are formed on opposite sides of said elongated center divider by said center divider and the outside or side dividers. Conventionally, a side divider is pivotal about a generally transverse horizontal axis, being responsive to surface topography by reason of engagement of its shoe with the ground, thereby to align a throat at the front of a row unit with the base of vegetation which will enter such throat.

The prior art teaches various efficient mechanisms for adjusting side dividers about a generally horizontal axis. However, no provision is made conventionally for adjusting a side divider with respect to a vertical axis. That is to say, in the harvesting of crops such as corn and the like, an obstruction can occur on the ground in the path of movement of a row unit. Should such obstruction not be seen by a harvester operator from an operator's position, and be inadvertently struck, any of a plurality of undesired consequences could result from such impact, among which are: jamming of the mechanism by means of which a divider is rockable or adjustable about a horizontal axis, and crushing of such divider with resultant injury to a gathering chain and other mechanisms which are carried adjacent such divider in each row unit. To obviate such an occurrence, dividers must be free and adapted to adjust in a direction other than about a horizontal axis.

The principal object of the instant invention is to provide an improved harvester device with a divider having an impact relief mechanism.

It is another object of the instant invention to provide in a harvester device improved means for relief of impact force upon a harvester divider or the like.

A further object of the instant invention is the provision of a divider or the like in a harvester device provided with means whereby upon impact such divider will rock about a substantially vertical axis.

Yet a further object of the instant invention is the provision of an impact relief device in a harvester divider which is responsive to impact forces and the like and which is restrained from accidental opening by application of force other than of impact intensity.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of one embodiment of the invention mounted in operable position on a corn harvester.

FIG. 2 is a side elevational view looking toward the inner surface of the lower and forward end portion of the casing of a row unit and illustrating a side divider.

FIG. 3 is a longitudinal sectional view taken on the line 3—3 of FIG. 2 and looking in the direction of the arrows.

FIG. 4 is a transverse sectional view taken substantially on the line 4—4 of FIG. 3 and looking in the direction of the arrows, parts being shown in dotted line for the purpose of illustration.

Referring now more particularly to the drawings, there is shown in FIG. 1 a corn harvester machine which includes a tractor generally designated by numeral 10. The tractor 10 has an elongated longitudinally extending body 11 in which there is carried a tractor engine mounted within engine housing 12. The tractor illustrated includes a pair of rear large-diameter traction wheels 13 which are relatively widely spaced apart laterally of the body 11 and only one of which is shown in the drawings. Said tractor 10 also includes a pair of steerable forward wheels (not seen in the drawings) which are operable in a conventional fashion by manipulation of steering wheel 14 from operator's position 15.

What are generally referred to as a pair of row units 16 and 17 are mounted on opposite sides of the tractor body 11. The row units are disposed substantially parallel to each other and comprise substantially like components, whereby the harvester is equipped to simultaneously harvest crops in two parallel rows as it moves forwardly in a path longitudinally of the body 11. As illustrated in FIG. 1, row units 16 and 17 are disposed angularly, sloping downwardly as they extend forwardly. Each of the row units 16 and 17 comprises an elevator housing 18 which slopes upwardly as it extends rearwardly and in which there is disposed a first elevator 21. Elevator 21 is adapted to be driven by means which may include a sprocket chain 19 operably connected to the engine in housing 12 and a drive shaft 20 which is journalled in the upper or delivery end portion of its respective elevator housing 18, as illustrated to the right in FIG. 1 in which only one of said sprocket chains 19 and its associated elevator 21 is shown.

Each row unit comprises a pair of cooperating snapping rolls 22. The rolls in each pair thereof are disposed in ear snapping relation adjacent the lower end portion 23 of the elevator 21, with the longitudinal axes of said rolls 22 extending longitudinally of the elevator end portion 23 and inclined to gravity feed snapped ears of corn onto the lower elevator end portion 23 for conveyance upward thereof rearwardly of the body 11 to a husking mechanism (not shown).

An arcuate or curved metal hood 24 partially covers the rolls 22 and the lower elevator end portion 23 of each of the row units 16 and 17. The snapping rolls 22 are inclined at an angle which is substantially the same as the angle of disposition of their respective row units 16 and 17. At their forward ends, the snapping rolls 22 provide a rear limit to a throat 25 which is defined on each side of the body 11 by a respective side plate 26 and the forward end portion of an associated hood 24. Into the inner end portion of each throat 25, there extend the teeth 27 of a conventional pair of endless gathering chains 57, one of which is disposed below the plate 26 and the other of which is disposed below the forward end portion of the hood 24, whereby a pair of chains on each side of the tractor 10 will gather corn stalks from a respective row into its throat 25 against snapping rollers 22 which in turn will snap ears from such stalks.

To prevent tractor wheels 13 from running over ears of down and leaning stalks, wheel shields 28 are mounted adjacent the forward end portions of the traction wheels 13 in any convenient or obvious manner, as illustrated in FIG. 1.

A U-shaped or channel-like face plate 29 is suitably carried on the lower front end portion of the body 11. Said face plate 29 carries a forwardly extending conventionally tapered and rounded half cone-shaped metal structure 30 which is variously referred to in the art as center divided, point or shoe, and which may be rockable about a horizontal axis by conventional means (not shown). Hereinafter, the member 30 shall be referred to as a center divider. Center divider 30 is adapted to be driven in an aisle between a pair of parallel rows of corn and to separate disaligned stalks into respective rows for efficient harvesting. At its outer or forward pointed end portion, said divider 30 carries what is variously referred to as a nose, point or shoe 31 which is adapted to engage the ground as the tractor advances to adjust said divider in a usual manner. In this description, the member 31 shall be referred to as a center shoe.

On the forward end potrion of each of the hoods 24, there is mounted a rounded tapered half cone-shaped member 32 which is variously referred to in the art as a side shoe, pointer or divider. In referring hereafter to the members 32, they shall be called side dividers. Each side divider 32 carries at its forward or outermost end portion what is variously referred to in the art as a tip, shoe or nose, which shall be referred to hereinafter in this description as a shoe 33. Each shoe 33 is conventionally of metallic fabrication and adapted to ride on the ground, to the end that the forward end portions of the row units 16 and 17 will adjust to variations in the contour of a surface. The inner surface of each divider 32, together with a cooperating side 34 of face plate 29, provides a forwardly widening entrance to the throat 25, as illustrated in FIG. 1. Each side divider 32 is adapted to engage outside of a respective row of corn, whereby a pair of rows are directed into the throats 25 as the harvester progresses in a forward direction.

To this point in the descritpion, the various structures to which reference has been had, to the extent described, have been conventional, and, accordingly, only general definitions have been provided. However, the side dividers 32 illustrated in the drawings depart from conventional construction by reason of provision of an impact relief construction which will be hereinafter described. But first, attention is invited to the fact that the details of construction of each of the side dividers 32 is substantially the same as the other, differing essentially only in one being a left and the other a right side divider, with components accordingly reversed. Therefore, only one side divider 32 is shown in FIGS. 2, 3 and 4 and described hereinafter.

As illustrated in FIG. 2, it is noted that the normal disposition of the row unit is angular, sloping downwardly as it extends forwardly as previously indicated. It is further seen that the shoe 33 is adapted to engage the ground which is represented in FIG. 2 by line 74. From the shoe 33, the side divider 32 extends upwardly and rearwardly. The side divider 32 is triangular in longitudinal section, and its shoe 33 comprises a cover with angularly disposed sides 34, as illustrated in FIG. 3 and which forms the apex angle of the triangular configuration of the divider 32. A flat triangular plate 35 which forms a ground engaging base is secured in transverse disposition between the sides 34 of shoe 33.

As additiionally illustrated in the drawings, the side divider 32 may be characterized as having side portions 36 and 37 which taper toward each other, and together with the top portion 38 toward a point as they extend forwardly toward the shoe 33 into a pocket of which, formed by the bent plate 34 and the bottom plate 35, they may be inserted, in a manner illustrated in FIG. 3. Furthermore, the side divider 32 provides between the lower edges of the sides 36 and 37 an enlarged opening over the ground 74; and it has an elongated frame 39 which is in the form of a truncated triangle in longitudinal section, as illustrated in FIG. 3, the legs of which are disposed against and secured to the inner surfaces of the lower end portions of the side parts 36 and 37, as illustrated in FIGS. 2 and 3.

At the inner end portion 40 of the side divider 32, the legs defining the frame member 39 are bent parallel to each other to provide a pair of parallel extensions 41 which are disposed on opposite sides of said divider 32. A transversely extending tie 72 which is integral with or at its opposite ends rigidly secured to the frame 39 rigidifies the frame member 39 and forms a dividing wall between the parallel frame extension 41 and the remainder of the frame 39.

As illustrated clearly in FIG. 4, the parallel frame extensions 41 have a pair of transversely aligned apertures 42 which are aligned with apertures 43 in the upwardly extending opposite arms 44 of a bracket 45. The bracket 45 is U-shaped with its arms 44 disposed adjacent inner surfaces of the frame extensions 41 to which said arms are secured by means of a pair of bolts 46 which extend through aligned apertures 42 and 43 on respective sides of the divider 32 and upon the threaded end portions 47 of which lock nuts 48 are respectively mounted, as illustrated in FIGS. 3 and 4.

As illustrated in FIGS. 2 and 4, the lower portion 49 of the bracket 45 includes the lower end portion of the bracket arms 44 and the bracket base 50, portion 49 being disposed below the lower edge 41 of the divider 32. The base 50 of the bracket 45 is adapted to be rockably seated on a transverse lip or extension 52 of the framework of hood 24. Said extension 52 provides a seat extending forwardly of said hood 24 upon which base 50 will slide, as illustrated in FIGS. 3 and 4.

The side divider 32 is rockable outwardly from its normal operative longitudinal alignment in its row unit by means of its rotational connection about a substantially vertical axis, as illustrated in FIGS. 1 and 3. In the embodiment of the invention shown in the drawings, the rotational connection is by means of a hinge mechanism 53 which is operably disposed between the rear end of divider 32 on the outer side 37 and the forward end of hood 24. Thereby, there is provided a vertical axis of rotation for the divider 32 which is adapted to swing from the solid line position shown in FIG. 3 (being the same as the position shown in FIGS. 1, 2 and 4) to the dotted line position shown in FIG. 3. One purpose which is served by enabling divider 32 to swing or pivot is that, upon impact at the forward end of the divider 32 with an obstruction in a field, the divider will not be damaged or jammed or cause damage or jamming to the gathering chain 57 which is disposed immediately behind the divider 32 under the hood 24. Instead, the divider 32 will relieve the impact force by swinging outwardly about a vertical axis the position of which may be as heretofore described.

To preclude pivoting, as aforesaid, or what might be considered lateral rocking or sidewise rotation of the side divider 32, except under impact forces of a predetermined intensity, there are provided a plurality of relatively fixed bolts 54 which extend upwardly through apertures 55 which are formed in the lip or extension 52. The upwardly extending stems 56 of the bolts 54 are disposed in transversely disposed recesses 58 provided in the base 50 of the bracket 45. The recesses 58 move in an arcuate path upon rocking of the divider 32 about its vertical axis of rotation. Accordingly, the recesses are disposed at an angle in base 50 to facilitate movement of bracket 45 about and away from stems 56.

As illustrated in FIG. 4, the upper portions 59 of the sides defining the recesses 58 are bevelled outwardly as they extend upwardly. The slope of upper sides 59 corresponds to the inclination of the lower surfaces of vertically apertured detents 60 which are mounted about stems 56, respectively. A compression spring 61 is mounted about each stem 56 with its lower end in abutment with an upper flat surface 62 of a respective detent 60 and with its upper end bearing against a washer or ring 63 which is disposed about a respective stem 56. Each washer 63 is adjustably held in position by a manually adjustable nut 64 which is mounted upon the upper threaded end portion 65 of each bolt 54 and which bears against the upper surface of its respective washer 63, as illustrated in the drawings.

It is appreciated from considering the drawings that when the divider 32 has swung to impact relief position, that is, the dotted line position shown in FIG. 3, the detents 60 will be driven against the extension or lip 52 under the action of compression springs 61, respectively. To reset the divider 32 in harvesting position, that is, the position illustrated in FIG. 1, the detents 60 will require elevation. Once the divider 32 has been returned to normal operative or harvesting position, the detents 60 will be spring-pressed into the seats provided in the fabric defining recesses 58 against the inclined wall portions 59, respectively. By adjusting the nut 64 longitudinally of stem 56, the compression force of springs 61 can be varied to control the pressure required to be overcome by impact force to cause divider 32 to rock outwardly. In normal operation of the device, until such impact force is reached the compression force of the spring 61 will act to force the detent 60 to hold the bracket 45 from rocking.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A driven elongated agricultural row unit disposed in a general front to rear relationship and comprising
means defining an elongated casing disposed angularly in a vertical plane with a forward end portion extending angularly downwardly;
a row divider having a rear end portion pivotally connected to the forward end portion of said casing and in normal harvesting position extending forwardly and downwardly therefrom into ground engagement;
an extension secured to the forward end portion of said casing,
said rear end portion having an aperture and being slidably mounted on said extension;
an upwardly extending stem carried on said extension and disposable in said aperture, said divider pivotable horizontally away from said stem;
a detent disposed about said stem and adjustably bearing against said rear end portion when said divider is in normal harvesting position, and
adjustable spring means for selectively tensioning said detent into divider holding position.

2. A driven elongated agricultural row unit disposed in a general front to rear relationship and comprising
means defining an elongated casing disposed angularly in a vertical plane with a forward end portion extending angularly downwardly;
a row divider having a rear end portion pivotally connected to the forward end portion of said casing and in normal harvesting position extending forwardly and downwardly therefrom into ground engagement;
pivoting means defining a vertical axis of rotation for said divider with respect to the forward end of said casing;
an extension secured to a forward end portion of said casing;
a bracket mounted on and extending transversely of said divider rear end portion,
said bracket having a portion disposed below said divider and slidably mounted on said extension, and
spring tensioned detent means for adjustably forcing said bracket against said extension,
whereby the impact force requirement for rocking said divider can be adjusted.

3. A driven elongated agricultural row unit disposed in a general front to rear relationship and comprising
means defining an elongated casing disposed angularly in a vertical plane with a forward end portion extending angularly downwardly;
a row divider having a rear end portion pivotally connected to the forward end portion of said casing and in normal harvesting position extending forwardly and downwardly therefrom into ground engagement;
pivoting means defining a vertical axis of rotation for said divider with respect to the forward end of said casing;
an extension secured to a forward end portion of said casing;
an upwardly extending stem secured to said extension;
a bracket mounted on and extending transversely of said divider rear end portion,
said bracket having a slidable portion disposed below said divider on said extension and having a rearwardly opening aperture disposed about said stem;
an adjustably tensioned detent mounted about said stem against said bracket; and
spring adjustment means for adjusting said detent,
whereby the impact force requirement for rocking said divider bracket from about said stem can be adjusted.

4. A driven elongated agricultural row unit disposed in a generally front to rear relationship and comprising:
means defining a casing having a front end portion defining a crop intake way;
row divider having a rear end portion pivotally connected to the front end portion of said casing and in normal harvesting position extending angularly downwardly and forwardly therefrom;
a ground-engaging shoe mounted on said row divider at the forward end portion of said row unit; and
impact relief means providing a generally vertical axis of rotation for said row divider, said impact relief means including, a bracket having an aperture formed therein mounted on said rear end portion, a plate secured adjacent said end portion and providing a seat on which said bracket is slidable, an upwardly extending stem carried by said plate and adapted to be disposed in said aperture when said row divider is in normal harvesting position, such that upon impact of said shoe with an obstruction said row divider will swing out from said casing about said vertical axis of rotation.

5. A driven elongated agricultural row unit disposed in a general front to rear relationship and comprising:

means defining a casing having a front end portion defining a crop intake way;

a row divider having a rear end portion pivotally connected to the front end portion of said casing and in a normal harvesting position extending angularly downwardly and forwardly therefrom;

a ground-engaging shoe mounted on said row divider at the forward end portion of said row unit;

impact relief means providing a vertical axis of rotation for said row divider such that upon impact of said shoe with an obstruction said row divider can swing out from said casing about said vertical axis of rotation; and adjustable divider holding means for adjusting the force with which said row divider is held in normal harvesting position comprising, an extension carried by and disposed at the front end portion of said casing, a slotted bracket rigidly secured to the rear end portion of said divider, a stem secured to and extending upwardly from said extension, and a spring pressed detent disposed about said stem and bearing against said bracket, whereby said divider is held in normal harvesting position against forces tending to pivot it outwardly.

References Cited
UNITED STATES PATENTS

| | | | |
|---|---|---|---|
| 1,926,338 | 9/1933 | Johnston | 56—119 X |
| 2,365,997 | 12/1944 | Belfer | 56—109 X |
| 3,035,390 | 5/1962 | Karlsson | 56—119 |

ANTONIO F. GUIDA, *Primary Examiner.*

ABRAHAM G. STONE, *Examiner.*

P. A. RAZZANO, *Assistant Examiner.*